(12) United States Patent
Lim et al.

(10) Patent No.: US 7,717,600 B2
(45) Date of Patent: May 18, 2010

(54) BACKLIGHT UNIT AND LIQUID CRYSTAL DISPLAY HAVING THE SAME

(75) Inventors: Dae-San Lim, Gyeonggi-Do (KR);
In-Jae Chung, Gyeonggi-Do (KR);
Jin-Hwan Jeon, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 21 days.

(21) Appl. No.: 11/320,703

(22) Filed: Dec. 30, 2005

(65) Prior Publication Data
US 2006/0291252 A1 Dec. 28, 2006

(30) Foreign Application Priority Data
Jun. 28, 2005 (KR) ................ 10-2005-0056581

(51) Int. Cl.
*F21V 7/04* (2006.01)
(52) U.S. Cl. .............. 362/606; 362/600; 362/602; 362/607; 362/611; 362/613; 362/614; 362/615; 362/617; 362/620; 362/97.1; 362/97.2; 362/97.3
(58) Field of Classification Search ............ 362/617, 362/618, 600, 602, 606, 607, 611, 612, 613, 362/614, 615, 620, 619, 97.1–97.3, 330
See application file for complete search history.

(56) References Cited

U.S. PATENT DOCUMENTS

| 6,164,790 | A  | * | 12/2000 | Lee ............................ 362/618 |
| 6,330,386 | B1 | * | 12/2001 | Wagner et al. .............. 385/120 |
| 6,554,440 | B2 | * | 4/2003  | Umemoto .................... 362/610 |
| 6,655,810 | B2 | * | 12/2003 | Hayashi et al. ............. 362/600 |
| 6,993,244 | B2 | * | 1/2006  | Kuo ............................ 385/120 |
| 7,108,416 | B1 | * | 9/2006  | Osawa ........................ 362/618 |

* cited by examiner

*Primary Examiner*—Sandra L O'Shea
*Assistant Examiner*—Mary Zettl
(74) *Attorney, Agent, or Firm*—McKenna Long & Aldridge

(57) ABSTRACT

Disclosed is a backlight unit and an LCD device having the same. The backlight unit comprises a plurality of light sources for generating light, a light guide plate for converting linear light generated from the light source into planar light and irradiating the light onto an LCD panel, a plurality of optical patterns formed on the light guide plate, wherein the optical patterns have different sizes for uniformly applying light incident onto the LCD panel to the entire LCD panel, and a diffusion sheet for transmitting light emitted from the light guide plate in a direction substantially perpendicular to the LCD panel.

11 Claims, 3 Drawing Sheets

BACKLIGHT UNIT AND LIQUID CRYSTAL DISPLAY HAVING THE SAME

This application claims the benefit of Korean Application No. 2005-56581, filed Jun. 28, 2005, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to a backlight unit capable of controlling a brightness and obtaining a high brightness, and an LCD device having the same.

2. Description of the Related Art

Generally, a liquid crystal display (LCD) device serves to display a desired image on a screen by controlling an amount of light transmitted to a backlight unit by a plurality of liquid crystal cells arranged in a matrix form and a liquid crystal panel composed of a plurality of controlling switches for switching video signals to be supplied to each of the liquid crystal cells.

The related art backlight unit of an LCD device will be explained with reference to FIG. 1.

FIG. 1 is a schematic view showing a construction of a backlight unit in accordance with the related art.

In FIG. 1, the related art backlight unit comprises a light guide plate 11 for guiding light beam 51 having passed through a light introducing portion 20, a reflection plate 31 disposed below the light guide plate 11 for reflecting the light beam 51 passing through a lower surface and a lateral surface of the light guide plate 11 towards an upper surface of the light guide plate 11, a first diffusion sheet 33 for diffusing the light beam 51 having passed through the light guide plate 11, a first prism sheet 35 and a second prism sheet 37 for controlling a moving direction of the light beam 51 having passed through the first diffusion sheet 33, a second diffusion sheet 39 for diffusing the light beam 51 having passed through the first prism sheet 35 and the second prism sheet 37, and an LCD panel 41 for receiving the light beam 51 diffused through the second diffusion sheet 39.

The light introducing portion 20 is composed of a light emitting lamp 21 for generating the light beam 51, and a lamp housing 23 for mounting the light emitting lamp 21 and reflecting the light beam 51 of the light emitting lamp 22 to the light guide plate 11.

The light beam 51 of the light introducing portion 20 is uniformly moved towards an upper surface of the light guide plate 11 via printed patterns formed at a lower surface of the light guide plate 11 so as not to satisfy a total reflection of the light beam 51 in every direction. The light beam 51 having been transmitted to the lower surface and the lateral surface of the light guide plate 11 is reflected by the reflection plate 31 thus to be transmitted to the upper surface of the light guide plate 11. An unexplained reference numeral 13 denotes a light guide reflection pattern.

The light beam 51 having passed the light guide plate 11 is diffused to an entire region of the LCD panel by the first diffusion sheet 33.

The light beam 51 having passed the first prism sheet 35 and the second prism sheet 37 passes through the second diffusion sheet 39 thereby to be incident on the LCD panel 41.

However, the related art backlight unit of an LCD device has the following problems.

In a process that a light beam generated from the light emitting lamp is guided to the light guide plate via the light introducing portion, whereas a large amount of the light beam is introduced to the light guide plate near the light introducing portion, a lesser amount of the light beam is introduced to the light guide plate distant from the light introducing portion.

Accordingly, the light beam is not uniformly distributed on the entire light guide plate, but is distributed with a different amount.

Therefore, in the related art light guide plate, a lamp brightness is not stabilized and the brightness is not easily controlled.

Furthermore, in the related art backlight unit, only a single light emitting lamp is used thereby to have a limitation in implementing various kinds of brightness.

SUMMARY OF THE INVENTION

Accordingly, the present invention is directed to a backlight unit and liquid crystal display device having the same that substantially obviates one or more of the problems due to limitations and disadvantages of the related art.

Advantage of the present invention is to provide a backlight unit capable of controlling a brightness and obtaining a high brightness, and an LCD device having the same.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described herein, there is provided a backlight unit for an LCD device, comprising: a plurality of light sources for generating light; a light guide plate for converting linear light generated from the light source into planar light and irradiating the light onto an LCD panel; a plurality of optical patterns formed in the light guide plate, wherein the optical patterns have different sizes for uniformly applying light incident onto the LCD panel to the entire LCD panel; and a diffusion sheet for transmitting light emitted from the light guide plate in a direction perpendicular to the LCD panel.

In another aspect of the present invention there is provided an LCD device having a backlight unit, comprising: an LCD panel; and a backlight disposed at a lower portion of the LCD panel, wherein the backlight comprises a plurality of light sources for generating light, a light guide plate for converting linear light generated from the light source into planar light and irradiating the light onto an LCD panel, a plurality of optical patterns formed in the light guide plate and having different sizes for uniformly applying light incident onto the LCD panel to the entire LCD panel, and a diffusion sheet for transmitting light emitted from the light guide plate in a direction perpendicular to the LCD panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Hereinafter, a backlight unit and a liquid crystal display (LCD) device having the same will be explained with reference to the attached drawings.

Figure 1:
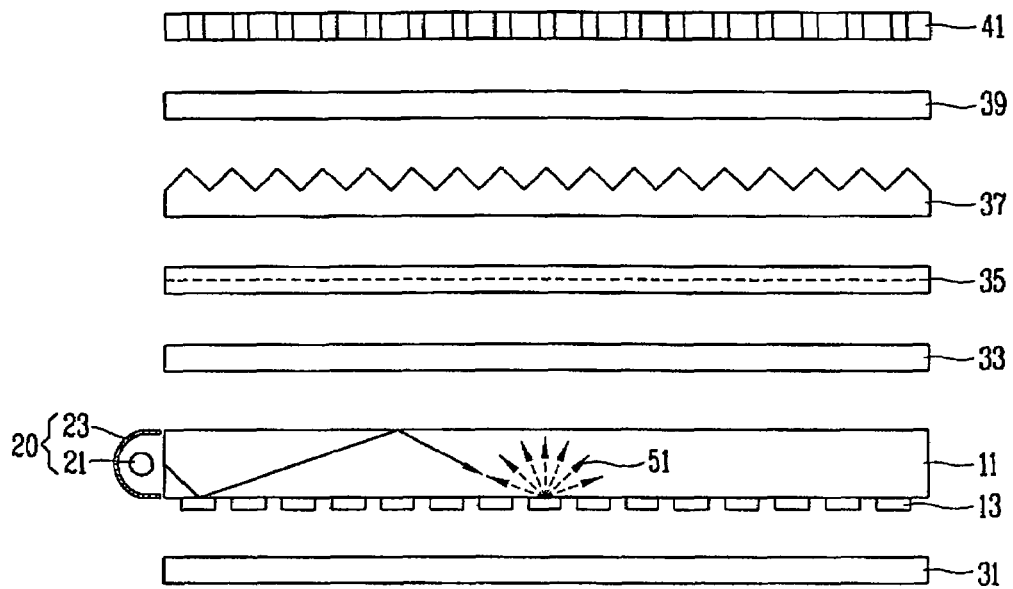
FIG. 1 is a schematic view showing a construction of a backlight unit in accordance with the related art.
Figure 2:
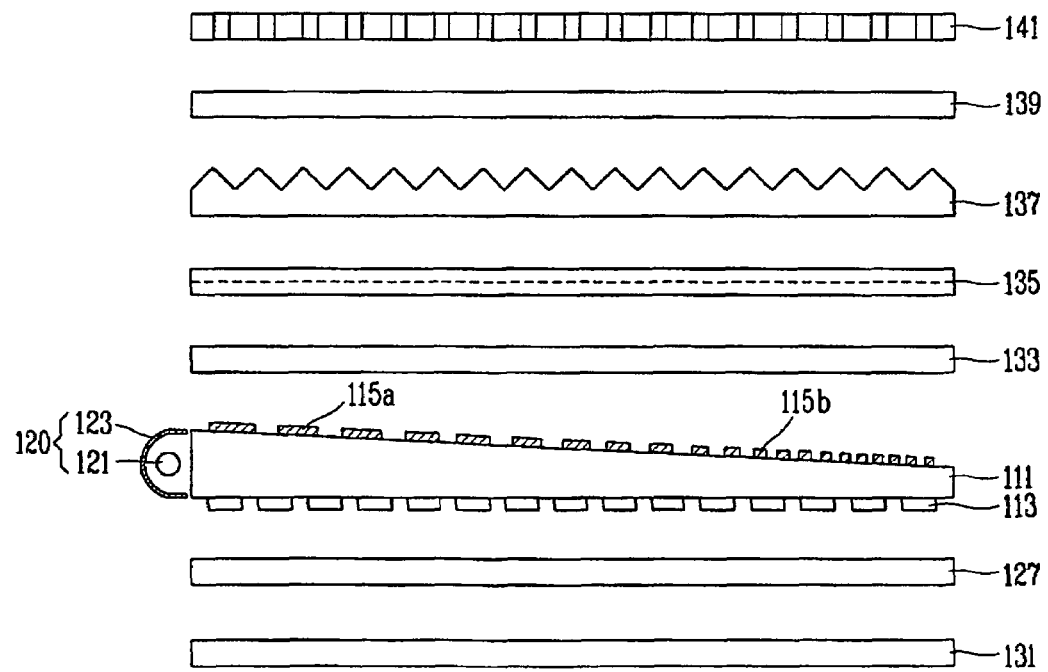
FIG. 2 is a schematic view showing a construction of a backlight unit according to the present invention.

Referring to FIG. 2, the backlight according to the present invention comprises a light guide plate 111 for guiding a light beam having passed through a first light introducing portion 120 and a second light introducing portion (not shown), a reflection plate 131 disposed below the light guide plate 111 for reflecting the light beam passing through a lower surface and a lateral surface of the light guide plate 111 towards an upper surface of the light guide plate 111, a first diffusion sheet 133 for diffusing the light beam having passed through the light guide plate 111, a first prism sheet 135 and a second prism sheet 137 for controlling a moving direction of the light beam having passed through the first diffusion sheet 133, a second diffusion sheet 139 for diffusing the light beam having passed through the first prism sheet 135 and the second prism sheet 137, and an LCD panel 141 for receiving the light beam diffused through the second diffusion sheet 139.

The first light introducing portion 120 is composed of a first light emitting lamp 121 for generating a light beam, and a first lamp housing 123 for mounting the first light emitting lamp 121 and reflecting the light beam of the first light emitting lamp 121 to the light guide plate 111.

The second light introducing portion (not shown) is composed of a second light emitting lamp 127 for generating a light beam, and a second lamp housing (lefer to FIG. 4B) for mounting the second light emitting lamp 127 and reflecting the light beam of the second light emitting lamp 127 to the light guide plate 111.

The light beam of the first light introducing portion 120 or the second light introducing portion 130 is uniformly moved towards an upper surface of the light guide plate 111 via printed patterns formed at a lower surface of the light guide plate 111 so as not to satisfy a total reflection of the light beam in every direction. The light beam having been transmitted to the lower surface and the lateral surface of the light guide plate 111 is reflected by the reflection plate 131 thus to be transmitted to the upper surface of the light guide plate 111. Then, the light beam 151 having passed through the light guide plate 111 is diffused to the entire region of the LCD panel 141 by the first diffusion sheet 133. An unexplained reference numeral 113 denotes a light guide reflection pattern.

The light beam having passed the first prism sheet 135 and the second prism sheet 137 passes through the second diffusion sheet 139 thereby to be incident on the LCD panel 141.

The first light emitting lamp 121 is disposed at a lateral surface of the light emitting plate 111 so as to be individually driven if necessary. That is, when a normal brightness is to be obtained, only the first light emitting lamp 121 is operated. On the contrary, when a relatively high brightness is to be obtained, the first light emitting lamp 121 and the second light emitting lamp 127 are simultaneously operated.

Figure 3:
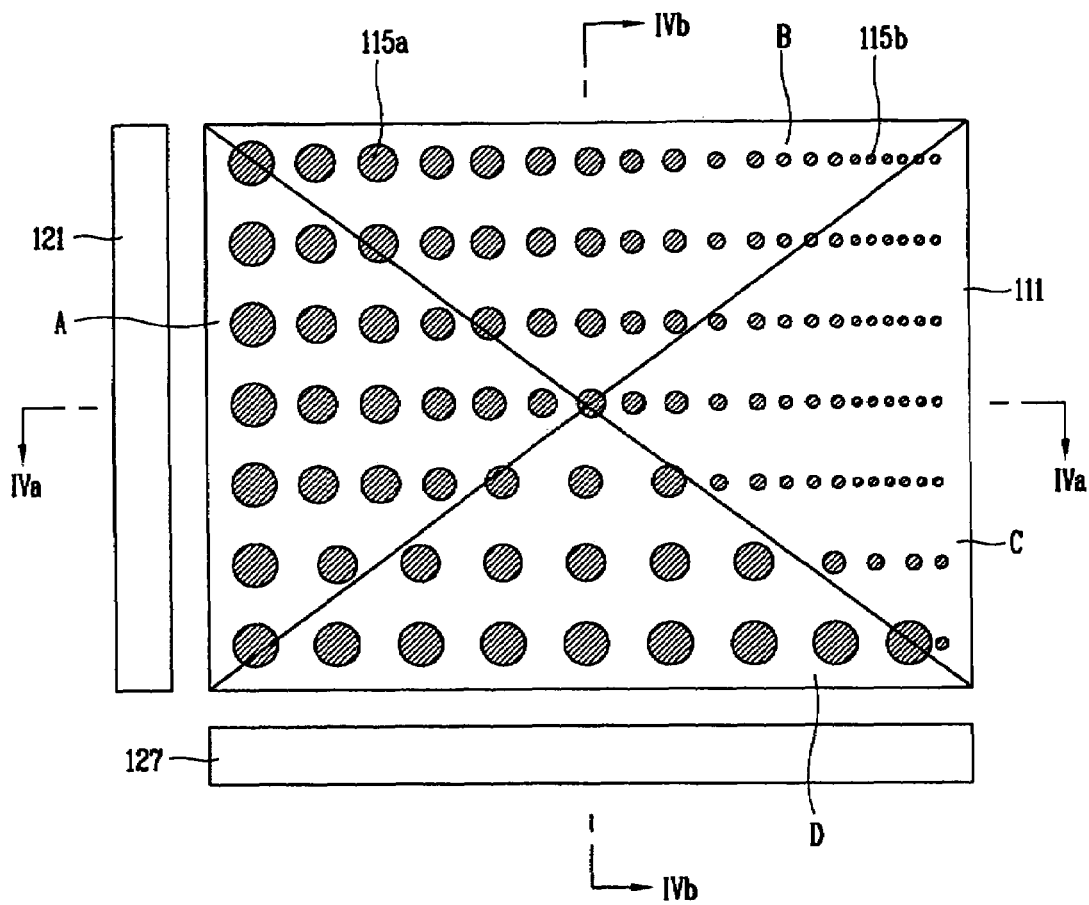
FIG. 3 is a plan view showing a light guide plate and a light emitting lamp in the backlight according to the present invention.
Figure 4A:
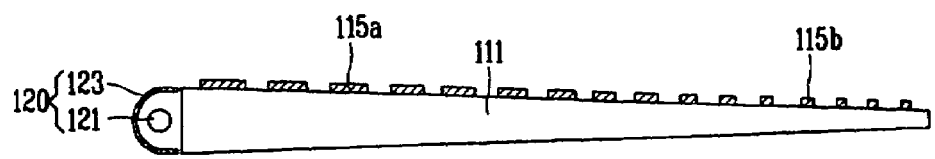
FIG. 4A is a sectional view schematically showing an optical pattern on the light guide plate and the light emitting lamp disposed at one side of the light guide plate, which is taken along line IVa-IVa of FIG. 3.
Figure 4B:
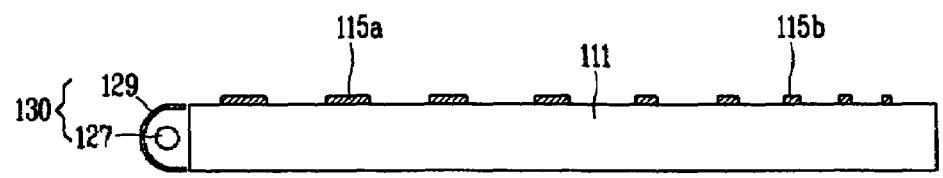
FIG. 4B is a sectional view schematically showing the light guide plate and the light emitting lamp disposed at another side of the light guide plate, which is taken along line IVb-IVb of FIG. 3.

Referring to FIGS. 3, 4A, and 4B, the light guide plate 111 has a substantially triangle pattern structure, and is divided into first, second, third, and fourth regions A, B, C, and D. Optical patterns 115a and 115b having different sizes for uniformly guiding the light beam are formed inside the regions A, B, C, and D. The closer to the first light introducing portion 120, the larger the optical patterns 115a are distributed. On the contrary, the more distant from the first light introducing portion 120, the smaller the optical patterns 115b are distributed.

The large optical patterns 115a are arranged to have a large gap therebetween, whereas the small optical patterns 115b are arranged to have a small gap therebetween.

In the first region A closet to the first light introducing portion 120, the large optical patterns 115a are arranged. On the contrary, in the fourth region D farthest from the first light introducing portion 120, small optical patterns 115b are arranged. In the second region B and the third region C corresponding to each other, the large optical patterns 115a and the small optical patterns 115b are arranged.

Figure 5:
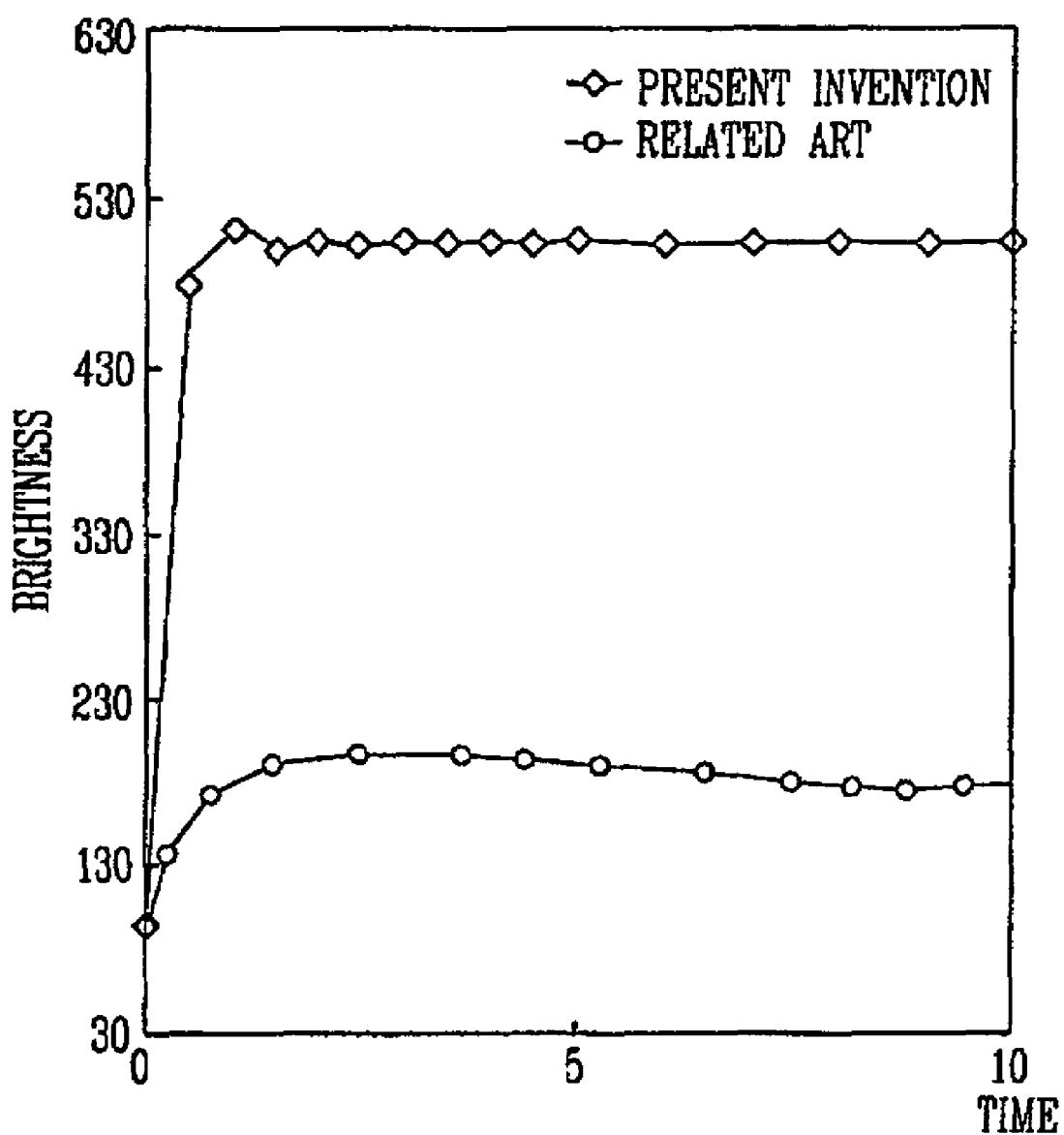
FIG. 5 is a graph showing a relation between time and brightness in the related backlight using a single light emitting lamp, and a relation between time and brightness in a backlight using a double light emitting lamp and a light guide plate where optical patterns are formed according to the present invention.

FIG. 5 is a graph showing a relation between time and brightness in the related art backlight using a single light emitting lamp, and a relation between time and brightness in a backlight using a double light emitting lamp and a light guide plate where optical patterns are formed according to the present invention.

Referring to FIG. 5, in the related art backlight, a low brightness corresponding to approximately 180° C. is uniformly implemented. On the contrary, in the backlight of the present invention, a high brightness corresponding to approximately 500° C. is uniformly implemented.

Accordingly, in the present invention, the structure of the light guide plate is changed by adding one lamp, thereby obtaining a relatively high brightness at the time of displaying a moving image.

As aforementioned, the backlight and the LCD device having the same according to the present invention have the following effects.

In the present invention, a straight type lamp is added to the related art straight type lamp at a lateral surface of the light guide plate. The two straight type lamps can be selectively driven. Also, optical patterns having different sizes are arranged in the light guide plate at four regions, thereby obtaining a relatively high brightness.

Furthermore, obscure rays due to separated lamps are minimized, the time taken to stabilize a lamp brightness is shortened, and the brightness can be partially controlled.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:

at least two straight type light emitting lamps for generating light, wherein a first of the straight type light emitting lamps is arranged at one side of the light guide plate, and another a second of the straight type light emitting lamps is arranged at another side of the light guide plate and is perpendicular to one side of the light guide plate, wherein one of the two straight type light emitting lamps is operated or the two straight type light emitting lamps are simultaneously operated;

a light guide plate for converting linear light generated from the straight type light emitting lamps into planar light and irradiating the light onto an LCD panel, wherein the light guide plate is divided into first, second, third, and fourth regions, the area of the first and third regions being the same size and the area of the second and fourth areas being the same size;

a plurality of optical patterns formed on the light guide plate, wherein the optical patterns comprises large and small optical patterns, and have different sizes for uniformly applying light incident onto the LCD panel to the entire LCD panel, wherein the large optical patterns nearest to the straight type light emitting lamps are arranged to have a large gap therebetween, whereas the small optical patterns farthest from the straight type light emitting lamps are arranged to have a smaller gap therebetween than that of the large optical patterns, and wherein the first region and the fourth region of the light guide plate are nearest to the straight type light emitting lamps are provided with the large optical patterns, and the third region of the light guide plate located opposite of the first region and farthest from the straight type light emitting lamps is provided with second the small optical patterns; and the second region located opposite the fourth region on the light guide plate has a mix of large optical patterns and small optical patterns, a diffusion sheet for transmitting light emitted from the light guide plate in a direction substantially perpendicular to the LCD panel.

2. The backlight unit of claim 1, wherein the second region is provided with first optical patterns and second optical patterns is smaller than the first optical patterns.

3. The backlight unit of claim 1, wherein the light guiding plate is provided with a reflection plate therebelow.

4. The backlight unit of claim 1, wherein the light guide plate and the diffusion sheet are provided with a prism sheet therebetween.

5. A liquid crystal display (LCD) device having a backlight unit, comprising:

an LCD panel; and a backlight disposed at a lower portion of the LCD panel, wherein the backlight comprises:

at least two straight type light emitting lamps for generating light, wherein a first of the straight type light emitting lamps is arranged at one side of the light guide plate, and a second of the straight type light emitting lamps is arranged at another side of the light guide plate and is perpendicular to one side of the light guide plate, and wherein one of the two straight type light emitting lamps is operated or the two straight type light emitting lamps are simultaneously operated;

a light guide plate for converting linear light generated from the straight type light emitting lamps into planar light and irradiating the light onto an LCD panel, the light guide plate is divided into first, second, third, and fourth regions, wherein one of the straight type light emitting lamps is arranged at one side of the light guide plate, and another of the straight type light emitting lamps is arranged at another side of the light guide plate, the area of the first and third regions being the same size and the area of the second and fourth areas being the same size;

a plurality of optical patterns formed on the light guide plate, wherein the optical patterns comprises first and second optical patterns, and have different sizes for uniformly applying light incident onto the LCD panel to the entire LCD panel, wherein the first optical patterns nearest to the straight type light emitting lamps are arranged to have a large gap therebetween, whereas the second optical patterns farthest to the straight type light emitting lamps are arranged to have a smaller gap therebetween than that of the first optical patterns, and wherein the first region and the fourth region of the light guide plate nearest to the straight type light emitting lamps is provided with first optical patterns, and the third region of the light guide plate located opposite the first region and farthest from the straight type light emitting lamps is provided with second optical patterns that are smaller than the first optical patterns, and the second region located opposite the fourth region on the light guide plate is provided with the first optical patterns and wherein the second optical patterns are smaller than the first optical patterns; and a diffusion sheet for transmitting light emitted from the light guide plate in a direction substantially perpendicular to the LCD panel.

6. The LCD device of claim 5, wherein the light guiding plate is provided with a reflection plate therebelow.

7. The LCD device of claim 5, wherein the light guide plate and the diffusion sheet are provided with a prism sheet therebetween.

8. A liquid crystal display (LCD) device having a backlight unit, comprising:

an LCD panel;

and a backlight disposed at a lower portion of the LCD panel, wherein the backlight comprises:

at least two straight type light emitting lamps for generating light, wherein a first of the straight type light emitting lamps is arranged at one side of the light guide plate, and another a second of the straight type light emitting lamps is arranged at another side of the light guide plate and is perpendicular to one side of the light guide plate, and wherein one of the two straight type light emitting lamps is operated or the two straight type light emitting lamps are simultaneously operated;

a light guide plate for converting linear light generated from the straight type light emitting lamps into planar light and irradiating the light onto an LCD panel, and is divided into first, second, third, and fourth regions, wherein one of the straight type light emitting lamps is arranged at one side of the light guide plate, and another of the straight type light emitting lamps is arranged at another side of the light guide plate is perpendicular to one side of the light guide plate, the area of the first and third regions being the same size and the area of the second and fourth areas being the same size;

a plurality of optical patterns formed on the light guide plate, wherein the first region of the light guide plate nearest to the straight type light emitting lamps is provided with large optical patterns, and the fourth region of the light guide plate farthest from the straight type light emitting lamps is provided with small optical patterns, wherein the large optical patterns are arranged to have a large gap therebetween, whereas the small optical patterns are arranged to have a smaller gap therebetween than that of the large optical patterns, wherein the first region and the fourth region of the light guide plate nearest to the first straight type light emitting lamps are provided with the large optical patterns, and the third region of the light guide plate located opposite of the first region and farthest from the straight type light emitting lamps is provided with the small optical patterns, and the second region located opposite the fourth region on the light guide plate is provided with the large optical patterns and the small optical patterns; and a diffusion sheet for transmitting light emitted from the light guide plate in a direction substantially perpendicular to the LCD panel.

9. The LCD device of claim 8, wherein the light guiding plate is provided with a reflection plate therebelow.

10. The LCD device of claim 8, wherein the light guiding plate and the diffusion sheet are provided with a prism sheet therebetween.

11. A liquid crystal display (LCD) device having a backlight unit, comprising:
an LCD panel;
and a backlight disposed at a lower portion of the LCD panel, wherein the backlight comprises: two straight type light emitting lamps for generating light, wherein a first of the two straight type light emitting lamps is arranged at one side of the light guide plate, and another a second of the straight type light emitting lamps is arranged at another side of the light guide plate and is perpendicular to one side of the light guide plate, and wherein one of the two straight type light emitting lamps is operated or the two straight type light emitting lamps are simultaneously operated;
a light guide plate for converting linear light generated from the straight type light emitting lamps into planar light and irradiating the light onto an LCD panel, and is divided into first, second, third, and fourth regions, the area of the first and third regions being the same size and the area of the second and fourth areas being the same size; and wherein the light guiding plate is provided with a reflection plate therebelow, and the light guiding plate and the diffusion sheet are provided with a prism sheet therebetween;
a plurality of optical patterns formed on the light guide plate, wherein the first and fourth regions of the light guide plate nearest to the light emitting lamps are provided with large optical patterns, wherein the large optical patterns are arranged to have a large gap therebetween, whereas the small optical patterns are arranged to have a smaller gap therebetween than that of the large optical patterns, and the third region of the light guide plate located opposite of the first region and farthest from the straight type light emitting lamps is provided with the small optical patterns, and the second region located opposite the fourth region on the light guide plate is provided with the large optical patterns and the small optical patterns; and a diffusion sheet for transmitting light emitted from the light guide plate in a direction substantially perpendicular to the LCD panel.

* * * * *